United States Patent [19]

Berry et al.

[11] 4,341,638

[45] * Jul. 27, 1982

[54] PURIFICATION OF PHOSPHORIC ACID

[75] Inventors: William W. Berry, Lakeland; Hanceford L. Allen, Bartow, both of Fla.

[73] Assignee: International Minerals & Chemical Corp., Terre Haute, Ind.

[*] Notice: The portion of the term of this patent subsequent to Mar. 17, 1998, has been disclaimed.

[21] Appl. No.: 85,677

[22] Filed: Oct. 17, 1979

[51] Int. Cl.$^3$ .................. C02F 1/56; C01B 25/16; B03B 1/00; B03D 3/06

[52] U.S. Cl. .................. 210/666; 423/321 R; 23/293 R; 209/5; 210/726; 252/411 R

[58] Field of Search .............. 423/321 R, 321 S; 23/293 R; 252/411 R; 209/5; 210/666, 726

[56] References Cited

U.S. PATENT DOCUMENTS

| | | | |
|---|---|---|---|
| T971,006 | 6/1978 | Smith | 423/321 |
| 1,981,145 | 11/1934 | Keller | 23/165 |
| 2,936,688 | 5/1960 | Williams | 210/71 |
| 2,998,504 | 6/1961 | Mazurek et al. | 210/53 |
| 3,099,622 | 7/1963 | Woerther | 210/49 |
| 3,160,998 | 12/1964 | Payne | 252/411 R X |
| 3,186,793 | 6/1965 | Gillis et al. | 423/321 R |
| 3,306,714 | 2/1967 | Goren | 23/321 |
| 3,697,233 | 10/1972 | Peck | 423/308 |
| 3,711,591 | 1/1973 | Hurst | 423/10 |
| 3,720,626 | 3/1973 | Benzaria et al. | 252/412 X |
| 3,773,852 | 11/1973 | Goyette et al. | 252/411 R X |
| 3,907,680 | 9/1975 | Hill | 210/71 |
| 3,993,733 | 11/1976 | Irani | 423/313 |
| 3,993,735 | 11/1976 | Irani | 423/321 R |
| 3,993,736 | 11/1976 | Irani | 423/321 S |
| 4,064,220 | 12/1977 | Alon | 423/321 R |
| 4,087,512 | 5/1978 | Reese et al. | 423/321 R |
| 4,256,710 | 3/1981 | Allen et al. | 423/321 R |

FOREIGN PATENT DOCUMENTS

| | | | |
|---|---|---|---|
| 7605359 | 8/1978 | France | 423/321 |
| 1103224 | 2/1968 | United Kingdom | 423/321 |

OTHER PUBLICATIONS

Hurst, "Recovering Uranium from Wet Process Phosphoric Acid" Chemical Engineering, 1-3, 1977 pp. 56-57.

"P$_2$O$_5$—The Production of Green Phosphoric Acid with Pittsburgh Activated Carbon" Calgon Technical Bulletin 1968.

Michel—"Laboratory Procedure for the Production of Green Wet Process P$_2$O$_5$..." Calgon Technical Paper 1970.

Blumberg "Newer Developments in Cleaning Wet Process Phosphoric" (1975).

*Primary Examiner*—Helen M. McCarthy
*Assistant Examiner*—Gregory A. Heller
*Attorney, Agent, or Firm*—Robert H. Dewey

[57] ABSTRACT

Phosphoric acid is purified by a process which comprises treating the crude acid solution with a body feed agent, powdered carbon and a flocculating agent to cause a major portion of the soluble and insoluble impurities to be removed in a single operation. In the preferred process, hot wet process phosphoric acid from the plant filter is first cooled to a temperature of from about 100° F. to about 130° F. and then treated in the above-described manner.

6 Claims, No Drawings

PURIFICATION OF PHOSPHORIC ACID

The present invention relates to a process for removing impurities from crude phosphoric acid solutions. More particularly, the present invention relates to a process for removing humates and inorganic salt forming compounds from wet process phosphoric acid.

"Wet Process" phosphoric acid is conventionally prepared by acidulating phosphate rock (which contains calcium phosphate) with sulfuric acid to produce phosphoric acid and insoluble calcium sulfate (gypsum). Phosphate rock, such as that mined in Florida and in many countries of the world such as Morocco, contains many impurities including carbonaceous matter, $SiO_2$ and other metallic contaminants. During the acidulation step, some of the carbonaceous material is converted to humic acids and related organic compounds generally referred to as humates. These humates are generally responsible for the black color of crude wet process phosphoric acid. This black acid product is normally filtered to remove gypsum, silica and other miscellaneous impurities. Filter-grade acid produced at this stage of the conventional process, however, still contains many metallic impurities, traces of unreacted silica, gypsum solids that crystallize after filtration and suspended humates of various particle sizes.

While filter-grade acid containing these impurities is not objectionable for fertilizer manufacture, for other applications filtered acid must be further purified. For example, wet process phosphoric acid contains significant amounts of uranium which can be separated for recovery by solvent extraction. The presence of impurities, especially the humates, tend to cause the formation of stable emulsions with the organic solvents used in the uranium extraction process. The buildup of these emulsion products in a countercurrent extraction system can seriously interfere with the extraction of uranium.

Those concerned with the recovery of uranium from wet process phosphoric acid have generally recognized that pretreatment of black phosphoric acid to remove humates is desirable. Among the techniques suggested for this clean-up step are oxidation, flocculation-clarification, treatment with activated carbon, and calcination. See Hurst, "Recovering Uranium From Wet Process Phosphoric Acid," *Chemical Engineering*, Jan. 3, 1977, pp. 56-57.

Smith, Defensive Publication No. T971,006 describes a sedimentation process for purifying wet process phosphoric acid in which a finely divided silica or silicate is employed as a settling aid. Among the silicates described in the Smith specification are clay, such as bentonite. Smith also describes the use of polymeric flocculating agents.

For prior art descriptions of activated carbon treatments to clarify phosphoric acid solutions, see e.g., Gillis, U.S. Pat. No. 3,186,793; Irani, U.S. Pat. No. 3,993,735, and "$P_2O_5$—The Production of Green Phosphoric Acid with Pittsburgh Granular Activated Carbon," Calgon Technical Bulletin (1968).

Reese, U.S. Pat. No. 4,087,512 describes a method for removing solid organic material from wet process phosphoric acid by mixing the acid with an organic hydrocarbon such as kerosene to form an emulsion which contains the organic impurities. This emulsion layer then is drawn off to leave a purified aqueous acid phase. Hill, U.S. Pat. No. 3,907,680 describes a process for purifying crude aqueous phosphoric solutions which comprises passing the crude solution through a layer of specially prepared perlite filter aid. Alon, U.S. Pat. No. 4,064,220 describes a method for removing dissolved organic matter from an aqueous acidic solution which comprises adding to the solution an aldehyde or aldehyde oligomer and a compound copolymerizable with an aldehyde followed by allowing the polymerization reaction to occur and separating the resulting polymer. For other methods of clarifying phosphoric acid solutions, see Koren, U.S. Pat. No. 3,306,714; Williams, U.S. Pat. No. 2,936,888; Mazurek, U.S. Pat. No. 2,988,504 and Woerther, U.S. Pat. No. 3,099,622.

As demonstrated by the foregoing, the art describes numerous attempts to solve the problem of crude phosphoric acid clarification. In view of the continued dwindling supply of conventional energy sources, any process which would materially enhance the development of alternative energy sources such as uranium would be a most welcome advance.

It is an object of the present invention, therefore, to provide a process for the purification of phosphoric acid and in particular for the purification of wet process phosphoric acid useful in uranium solvent extraction processes which avoids the problems of the prior art.

More specifically, it is an object of the present invention to provide a process for the efficient and economic removal of impurities from crude phosphoric acid solutions.

In accordance with these and other objectives the present invention provides a process for purifying phosphoric acid comprising the steps of: (a) mixing said acid with a body feed agent to cause floccules of suspended impurities to form; (b) adding powdered carbon to the mixture of step (a) in an amount sufficient to absorb remaining impurities in the acid; (c) adding a flocculating agent to the mixture of step (b) in an amount sufficient to cause said floccules to settle; and (d) separating the supernatant acid solution from the settled sludge.

While the purification process of the present invention is broadly applicable to removal of organic and inorganic impurities from phosphoric acid solutions of any source, it is particularly well suited to the removal of impurities found in filter grade wet process phosphoric acid produced as described above. The invention will, therefore, be described with reference to purification of wet process phosphoric acid.

The process of the present invention finds particular utility in smaller phosphoric acid facilities. In large phosphoric acid facilities purification economics favor the use of granular carbon absorbents. A process employing such granular absorbents is described in commonly assigned U.S. application Ser. No. 22,083 entitled "Purification of Phosphoric Acid", filed Mar. 19, 1979 in the names of Allen and Berry. The process described in that application results in extended carbon life and facilitates more efficient regeneration in accordance with the regeneration process described in commonly assigned U.S. application Ser. No. 22,082 entitled "Regeneration of Activated Carbon" filed on Mar. 19, 1979 in the names of Allen, Berry and Leibfried. Even with the extended carbon life attainable under the aforementioned processes, however, the granular carbon absorbents eventually become spent. The present invention is based in part on the discovery that ground spent granular carbon provides an effective and economically attractive source of powdered carbon for the purification of phosphoric acid—especially in smaller phosphoric acid facilities.

In the first step of one embodiment of the process of the present invention, wet process phosphoric acid from the gypsum filter (at a temperature of about 140°–150° F.) is subjected to a cooling step. In general, cooling to a temperature in the range of from about 100° F. to about 130° F. is suitable. The lower limit of the cooling temperature range is dictated primarily by economic considerations. It has been found that cooling filter-grade phosphoric acid much below 100° F. requires considerable additional equipment, resulting in additional capital cost. Cooling to a temperature in the range of about 115°–125° F. is preferred. Most preferred is cooling to about 120° F. The cooling preferably should take place over a relatively short period of time. The acid cooling step may be accomplished in suitable equipment of any conventional design. In practice, spiral coolers of the type normally used in phosphoric acid processing are well suited to this application and effect very rapid cooling.

As would be expected, the cooling of the crude acid reduces the supersaturation of the solution with respect to inorganic solids such as gypsum and the like. Despite this fact it is known in the art that cooling makes phosphoric acid more viscous and therefore reduces the rate of settling of precipitated solids. See, Woerther, U.S. Pat. No. 3,099,622. For this reason the prior art teaches away from employing cooling in conjunction with a settling process. The prior art practice of cooling the phosphoric acid prior to solvent extraction is directed to improving extraction coefficients and does not provide any teaching with respect to the advantages achieved by the combined purification process of the present invention.

In the case of impure phosphoric acid solutions from sources other than the hot plant filter stream, it may not be necessary to cool the acid as the first step of this process.

The next step of the process of the present invention comprises mixing the cooled crude acid solution with a body feed material. The purpose of this additive is to build up floccules of the suspended insoluble impurities, e.g., insoluble humates, and, if possible, to absorb a portion of the soluble humates. Among the suitable body feed materials are clays and similar substances as described in Smith, Defense Publication No. T971,006 and in pending U.S. application Ser. No. 972,842 filed Dec. 26, 1978 (commonly assigned with the present application). Most preferred as a body feed material in the purification of wet process phosphoric acid are the bentonite clays, especially activated bentonite of the type found in Mississippi. The activated clay body feed is preferably added at a particle size of about 200 mesh although larger and smaller particle sizes will be generally equally effective. In general, the clay body feed material can be added to the phosphoric acid solution in an amount of from about 0.05% to 1% by weight of the solution. In actual practice, amounts of about 0.3% to 0.35% have proven most preferred.

In the next step of the perferred process a powdered carbon absorbent is added to the clay body feed-containing mixture, after the clay has been completely mixed with the acid. The addition of powdered carbon serves to absorb remaining soluble humates and other impurities in the acid. Surprisingly the powdered carbon, which has a stronger affinity than clay for some of these impurities does not cause any impurities desorption from the clay floccules. Powdered carbon useful in this process can come from any suitable source. Virgin activated carbon powder is suitable but the preferred absorbent is obtained by grinding spent granular carbon. Spent carbon granules from an absorption column used in the purification of phosphoric acid are a very convenient, economical, and therefore, preferred source of raw materials for the carbon grinding process. Spent carbon granules can be ground in any conventional size reduction apparatus, such as a ball mill or roller mill. Particles ranging in up to about −60 mesh may be employed. It is preferred to grind the granules to about −100 mesh. In general particle sizes less than about 200 mesh are not preferred.

Powdered carbon addition should be in an amount effective to absorb sufficient remaining impurities in the mixture to give the desired final acid color. This amount will of course vary with the nature and content of impurities in the feed acid and the final acid color desired. In practice when used in conjunction with a clay body feed, amounts of powdered carbon in the range of about 5 to 20 lbs per ton of $P_2O_5$ have proven suitable. The sequential mixing of cooled phosphoric acid, body feed and powdered carbon should be effected by vigorous agitation, e.g., in a stirred reactor. Retention time in the body feed addition stage should be generally from about 5 to 10 minutes or less. A retention time of from about 10 to 15 minutes is generally sufficient for the carbon addition stage. Extended agitation can result in mechanical attrition of the floccules built up in the system. The combination of a body fed additive and powdered carbon serves to remove a substantial portion of the soluble and insoluble inorganic and humate impurities present in crude acid solution.

After a suitable retention time in the stirred reactors, phosphoric acid solution containing clay and powdered carbon is mixed with a flocculating agent to promote sedimentation of the suspended solids. The flocculating agent should be chosen so as to be compatible with the body feed additive employed. Observation of the surface charge properties (i.e., zeta potentials) of the components and selection of compatible mixtures is well known in the art and does not constitute part of this invention. See, for example, Smith Defensive Publication No. T971,006. Among the suitable flocculating agents for the practice of the present invention are various commercially available polyelectrolytes. One such flocculating agent is Nalco 7873 produced by Nalco Chemical Company.

Flocculating agent is generally added in a clarifying amount, i.e., an amount sufficient to produce rapid settling over a reasonable period of time. In general, amounts from about 5 to about 15 ppm based on the acid solution are effective. Typically, amounts of about 10 ppm are suitable when employing the flocculating agents described above.

In operation, the flocculating agent is added to the acid solution containing body feed and carbon and agitated gently for about 1½ to about 2 minutes. After a suitable mixing time the suspension is allowed to settle. In practice, the settling is achieved by continuous overflow to a clarifier in which typical area flow rates are between about 0.03 and 0.07 gallons per minute per square foot. Flow rates through the clarifier, will, of course, vary with the particular design of the equipment. The clarified acid may be subjected to a polish filtration step if desired to ensure complete carbon removal. The sludge from the clarifier can be sent back to the phosphoric plant filter or to an underflow filter specifically designed for this application. This mixture is more easily processed through conventional filtering equipment than regular phosphoric acid sludge.

The present invention also relates to the use of powdered carbon obtained by grinding spent granular carbon absorbents as an agent for purifying phosphoric acid. In addition to the use of this material described above (i.e., in conjunction with a body feed), applicants have surprisingly discovered that this special powdered carbon is generally useful in phosphoric acid purification. In this more general process powdered carbon of the type described above is contacted in any suitable mixing vessel with a crude phosphoric acid solution. Amounts of up to about 20 to 25 lbs or more of carbon per ton of $P_2O_5$ may be employed depending on the feed acid and desired acid color. After a suitable contact period, e.g., up to about 10 to 30 minutes, the carbon is then separated from the clarified acid by any known means such as filtration.

The following specific example is intended to illustrate more fully the nature of the present invention without acting as a limitation on its scope.

EXAMPLE

Brown phosphoric acid from a conventional wet process phosphoric acid plant containing approximately 27.9% $P_2O_5$ and 0.129 grams per liter of U, at a temperature of about 140° F., was introduced to a purification unit at the rate of about 5 gallons per minute. The acid was cooled in a heat exchanger to 119° F. A bentonite clay was added to the cooled acid in a stirred-tank mixer at the rate of about 0.3% by weight of the acid. This mixture overflowed to a second mixing vessel where about 10 lbs of powdered carbon per ton of $P_2O_5$ was added. Fresh lignite based carbon, essentially $-200$ mesh, was used for this test, though other types e.g., bituminous, etc. are acceptable. Flocculant, specifically Nalco 7873, was added at the rate of about 10 to 15 ppm by weight in a flocculation tank. This material was overflowed from the flocculation tank to a clarifier where the solids were permitted to settle. In this clarification step a major portion of the suspended solids and acid color were removed. In this example the solids in the feed acid were 2% by volume and the acid was a dark brown color. The clarified acid contained less than 0.12 solids by volume and over 70% of the color bodies had been removed, as measured on a spectrophotometer.

While certain specific embodiments of the invention have been described with particularity herein, it will be recognized that various modifications thereof will occur to those skilled in the art. Therefore, the scope of the invention is to be limited solely by the scope of the appended claims.

We claim:

1. A process for purifying phosphoric acid comprising the steps of:
    (a) cooling the phosphoric acid;
    (b) mixing said phosphoric acid with a body feed agent to cause floccules of suspended impurities to form;
    (c) adding powdered carbon to the mixture of step (b) in an amount sufficient to absorb remaining impurities in the acid;
    (d) adding a flocculating agent to the mixture of step (c) in an amount sufficient to cause said floccules to settle; and
    (e) separating the supernatant acid solution from the settled sludge.

2. A process for purifying filter-grade wet process phosphoric acid comprising the steps of:
    (a) cooling said phosphoric acid to a temperature of from about 100° F. to about 130° F.;
    (b) mixing the cooled acid of step (a) with a body feed agent to cause floccules of suspended impurities to form;
    (c) adding powdered carbon to the mixture of step (b) in an amount sufficient to absorb remaining impurities in the acid;
    (d) adding a flocculating agent to the mixture of step (c) in an amount sufficient to cause said floccules to settle; and
    (e) separating the supernatant acid solution from the settled sludge.

3. The process of claim 2 wherein said filter-grade acid is cooled to a temperature in the range of from about 115° F. to 125° F.

4. The process of claim 1 or 2 wherein said body feed agent comprises an activated clay.

5. The process of claim 4 wherein said clay is a bentonite.

6. The process of claims 1 or 2 wherein said powdered carbon is obtained by grinding spent granular carbon.

* * * * *

UNITED STATES PATENT AND TRADEMARK OFFICE
CERTIFICATE OF CORRECTION

PATENT NO. : 4,341,638
DATED : July 27, 1982
INVENTOR(S) : William W. Berry and Hanceford L. Allen It is certified that error appears in the above-identified patent and that said Letters Patent are hereby corrected as shown below:

Column 4, line 29, "fed" should read -- feed --

Signed and Sealed this

Fourteenth Day of December 1982

[SEAL]

Attest:

GERALD J. MOSSINGHOFF

Attesting Officer

Commissioner of Patents and Trademarks